(12) United States Patent
Wheeler

(10) Patent No.: US 9,075,966 B2
(45) Date of Patent: *Jul. 7, 2015

(54) SYSTEM AND METHOD FOR LOADING APPLICATION CLASSES

(71) Applicant: Osocad Remote Limited Liability Company, Wilmington, DE (US)

(72) Inventor: Thomas Wheeler, Frisco, TX (US)

(73) Assignee: Oscad Remote Limited Liability Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/165,293

(22) Filed: Jan. 27, 2014

(65) Prior Publication Data

US 2014/0143895 A1  May 22, 2014

Related U.S. Application Data

(63) Continuation of application No. 12/629,934, filed on Dec. 3, 2009, now Pat. No. 8,677,506.

(51) Int. Cl.
*H04L 29/06* (2006.01)
*G06F 21/12* (2013.01)
*G06F 21/51* (2013.01)
(Continued)

(52) U.S. Cl.
CPC .............. *G06F 21/121* (2013.01); *G06F 21/51* (2013.01); *G06F 21/53* (2013.01); *G06F 21/54* (2013.01); *G06F 2221/2141* (2013.01); *G06F 2221/2149* (2013.01); *H04L 63/105* (2013.01)

(58) Field of Classification Search
CPC ..... G06F 21/60; G06F 21/62; G06F 21/6218; G06F 21/21; H04L 63/10; H04L 63/20

USPC ...................................................... 726/27, 30
See application file for complete search history.

(56) References Cited

U.S. PATENT DOCUMENTS 5,784,463 A * 7/1998 Chen et al. ..................... 713/171
5,848,232 A * 12/1998 Lermuzeaux et al. .......... 726/21
6,044,467 A   3/2000 Gong
(Continued)

FOREIGN PATENT DOCUMENTS

EP   1416353   2/2004
EP   1507211   5/2004
(Continued)

OTHER PUBLICATIONS

Gong, Li; "Secure Java Class Loading"; Internet Computing, IEEE, vol. 2, No. 6, pp. 56-61, Nov./Dec. 1998; doi: 10, 1109/4236.735987; URL: http://ieeexplore.ieee.org/stamp.jsp?tp=&arnumber=735987&isnumber=15853.
(Continued)

*Primary Examiner* — Michael S McNally
(74) *Attorney, Agent, or Firm* — Stolowitz Ford Cowger LLP

(57) ABSTRACT

In an application, variants of a class may be generated and associated with different security permissions for the application. When a class is to be loaded, a determination is made as to the application's security permissions, e.g. by decoding a security token. The class is then retrieved from a repository that stores class variants matching the required security level. The retrieved class variant, which may have a full or a reduced functionality as appropriate for the security permission may then by loaded.

20 Claims, 5 Drawing Sheets

(51) Int. Cl.
*G06F 21/53* (2013.01)
*G06F 21/54* (2013.01)

(56) References Cited

U.S. PATENT DOCUMENTS

| | | | |
|---|---|---|---|
| 6,173,404 B1 * | 1/2001 | Colburn et al. | 726/17 |
| 6,871,277 B1 * | 3/2005 | Keronen | 713/167 |
| 6,895,586 B1 | 5/2005 | Brasher et al. | |
| 7,424,543 B2 | 9/2008 | Rice | |
| 7,614,047 B1 * | 11/2009 | Wang | 717/170 |
| 7,653,811 B2 | 1/2010 | Yagiura | |
| 8,229,974 B2 | 7/2012 | Lowry et al. | |
| 8,271,369 B2 | 9/2012 | Gilmore | |
| 2001/0027527 A1 * | 10/2001 | Khidekel et al. | 713/201 |
| 2002/0035514 A1 | 3/2002 | Whitley | |
| 2002/0174010 A1 | 11/2002 | Rice | |
| 2003/0033539 A1 | 2/2003 | Cheng | |
| 2003/0200436 A1 * | 10/2003 | Eun et al. | 713/172 |
| 2004/0142682 A1 * | 7/2004 | Kamiya et al. | 455/418 |
| 2004/0158718 A1 | 8/2004 | Gelbord et al. | |
| 2005/0235291 A1 | 10/2005 | Kamiya | |
| 2005/0262494 A1 | 11/2005 | Fung et al. | |
| 2006/0037082 A1 | 2/2006 | LaMacchia et al. | |
| 2006/0047659 A1 | 3/2006 | Yagiura | |
| 2006/0047954 A1 * | 3/2006 | Sachdeva et al. | 713/165 |
| 2006/0070112 A1 | 3/2006 | LaMacchia et al. | |
| 2006/0173974 A1 * | 8/2006 | Tang | 709/217 |
| 2006/0288404 A1 | 12/2006 | Kirshnan et al. | |
| 2007/0011749 A1 * | 1/2007 | Allison et al. | 726/26 |
| 2007/0162961 A1 * | 7/2007 | Tarrance et al. | 726/5 |
| 2007/0174281 A1 | 7/2007 | Chase | |
| 2008/0159540 A1 * | 7/2008 | Maetz et al. | 380/277 |
| 2008/0168528 A1 | 7/2008 | Lin et al. | |
| 2008/0192643 A1 | 8/2008 | Bae et al. | |
| 2008/0201693 A1 | 8/2008 | Centonze et al. | |
| 2008/0301710 A1 | 12/2008 | Shetty | |
| 2009/0193492 A1 | 7/2009 | Banerjee et al. | |
| 2009/0193515 A1 | 7/2009 | Kamiya et al. | |
| 2009/0232141 A1 | 9/2009 | Fersman et al. | |
| 2009/0320121 A1 | 12/2009 | Maida-Smith et al. | |
| 2010/0036869 A1 | 2/2010 | Lowry et al. | |
| 2010/0312630 A1 * | 12/2010 | Krutchik et al. | 705/14.35 |
| 2011/0083162 A1 | 4/2011 | Sathish | |
| 2011/0138460 A1 | 6/2011 | Wheeler | |

FOREIGN PATENT DOCUMENTS

| | | |
|---|---|---|
| JP | 5241797 | 9/1993 |
| JP | 8263441 | 11/1996 |
| JP | 2003332978 | 11/2003 |
| JP | 2004152022 | 5/2004 |
| JP | 2006040146 | 9/2006 |
| JP | 2006344057 | 12/2006 |
| JP | 2007213595 | 8/2007 |
| JP | 2009271567 | 11/2009 |
| WO | 2011068630 | 6/2011 |

OTHER PUBLICATIONS

Gong, Li; "Java Security Architecture" (JDK 1.2) Version 1.0; Internet Citation, Dec. 6, 1998; XP002171445; retrieved Jul. 9, 2001; 62 pages.

European Patent Office; Extended search report for EP application 10193298.6, Patent No. 2341457; May 31, 2012; 8 pages.

European Patent Office; IB International Preliminary Report on Patentability and Written Opinion of the ISA, PCT/US2010/055703; Jun. 14, 2012; 6 pages.

European Patent Office; PCT Search Report and Written Opinion; PCT/US2010/055703; Jan. 25, 2011; 11 pages.

Stolowitz Ford Cowger LLP, Portland, OR; Related Case Listing; Jan. 27, 2014, 1 Page.

* cited by examiner

SYSTEM AND METHOD FOR LOADING APPLICATION CLASSES

RELATED APPLICATIONS

This application is a continuation of and claims priority benefit to U.S. patent application Ser. No. 12/629,934, filed Dec. 3, 2009, now issued as U.S. Pat. No. 8,677,506, which is incorporated herein in its entirety.

FIELD OF THE INVENTION

This disclosure relates to secure applications and in particular to loading classes into applications based on user security permissions.

BACKGROUND OF THE INVENTION

When invoking an application on a device, it may be necessary to prevent unauthorized access to the application or to some capabilities of the application depending on the security permissions of the user. Existing solutions use conditional logic within application logic or within a security module to determine whether protected capabilities can be accessed. However, if permissions are set incorrectly, either accidentally or through malicious intent, protected capabilities may be accessed if the code implementing those capabilities is visible to the application. This can be a serious problem in distributed applications.

What is required is an improved system and method for developing and/or providing secure applications.

SUMMARY OF THE INVENTION

In one aspect of the disclosure, there is provided a method for loading a class in an application comprising determining a class requirement, determining a security permission, retrieving a class variant of the required class associated with the security permission and loading the retrieved class variant.

In one aspect of the disclosure, there is provided an application comprising a request handler and at least one class loader. The request handler may be configured to process a request for a class and determine a security permission of the application. The class loader may be configured to load a class variant dependent on the security permission.

In one aspect of the disclosure, there is provided a computer-readable medium comprising computer-executable instructions for execution by a processor, that, when executed, cause the processor to decode a security token, determine a security permission from the security token, select a class repository associated with the security permission, and load a class from the selected class repository.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
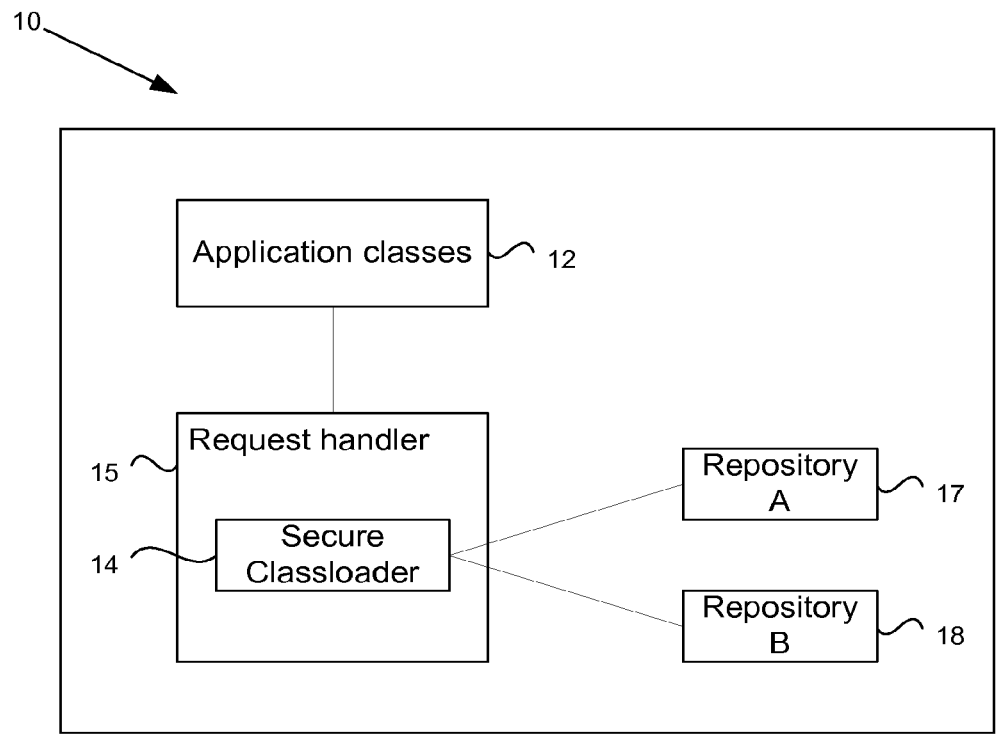
FIG. 1 illustrates an application structure.

An application structure 10 is illustrated in FIG. 1. The application 10 includes application classes 12 that have been loaded and are used to perform the functions of the application. Application classes are typically loaded using a classloader 14 within a request handler 15. In an embodiment of the present disclosure, the application 10 may be configured to have a set of security permissions encoded as a security token. When the application performs a secure operation, the request handler 15 intercepts the invocation. The request handler 15 may be local to the caller or in a remote process. The class loader of the present embodiment is configured to load multiple variants of classes based on the permissions encoded in the security token. The security token may be generated when the application is installed on a specific computing device, when a user performs a login operation, or by any other means that establishes the user's security credentials. In a distributed application, the security token may be passed between processes using established mechanisms for performing remote operations, such as remote invocation through a secure (encrypted) connection. The class loader 14 uses the security permissions to determine which variant to load.

Figure 2:
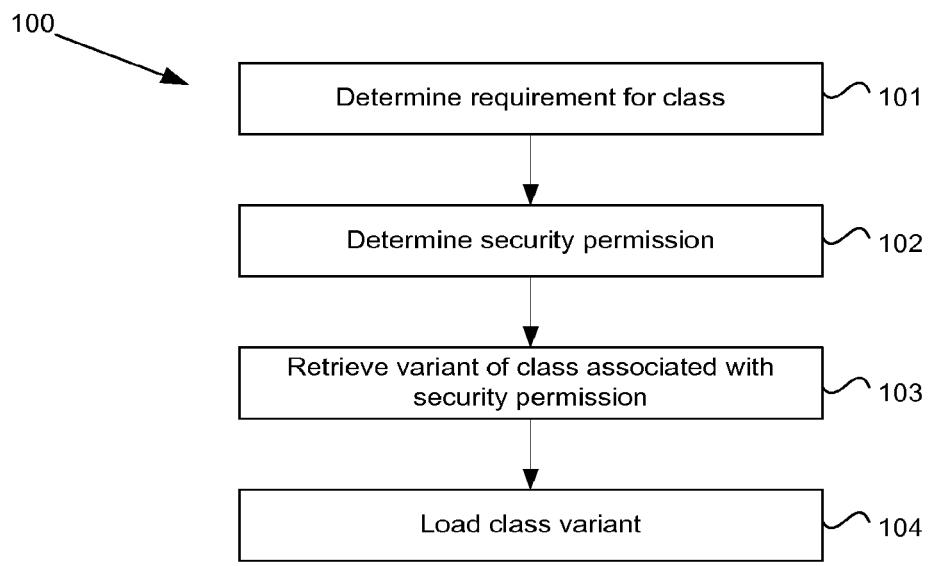
FIG. 2 illustrates a process for loading classes into the application of FIG. 1.

A process for loading a class is shown in the flowchart 100 of FIG. 2. At step 101, a requirement for a class to be loaded is generated. The security permissions for the application are then evaluated (step 102). A class variant of the required class associated with the security permission is then retrieved (step 103) and loaded (step 104).

A specific set of permissions is mapped to a specific variant set of classes. Each set may contain a different group of classes. However, each variant class that will be directly accessed by the application has the same name and namespace and provides the same public API. Each set of variant classes is contained in a separate repository, such as Repository A 17, Repository B 18, etc. The class repositories may be located locally in the filesystem or available via the network from a central remote server. The classloader 14 determines which repository to load classes from using the security permissions. When the application requires access to a class subject to security permissions, the class loader will load a variant of the class from the appropriate repository based on the application's permissions. This protects the system from accidental or malicious use of protected capabilities. Because each variant of the class has the correct namespace and provides the correct public API, the class will execute properly when loaded and invoked within the application.

One variant of the class may be coded to provide a full capability that is only accessible by a user with administrative security permissions while another variant of the same class may be coded to provide a reduced functionality accessible by a user with read-only security permissions. For example, one class variant may support creation and deletion of all user accounts, another class variant may support updating account information but not creation or deletion, and a third class variant may only support viewing account information for the current user.

Figure 3:
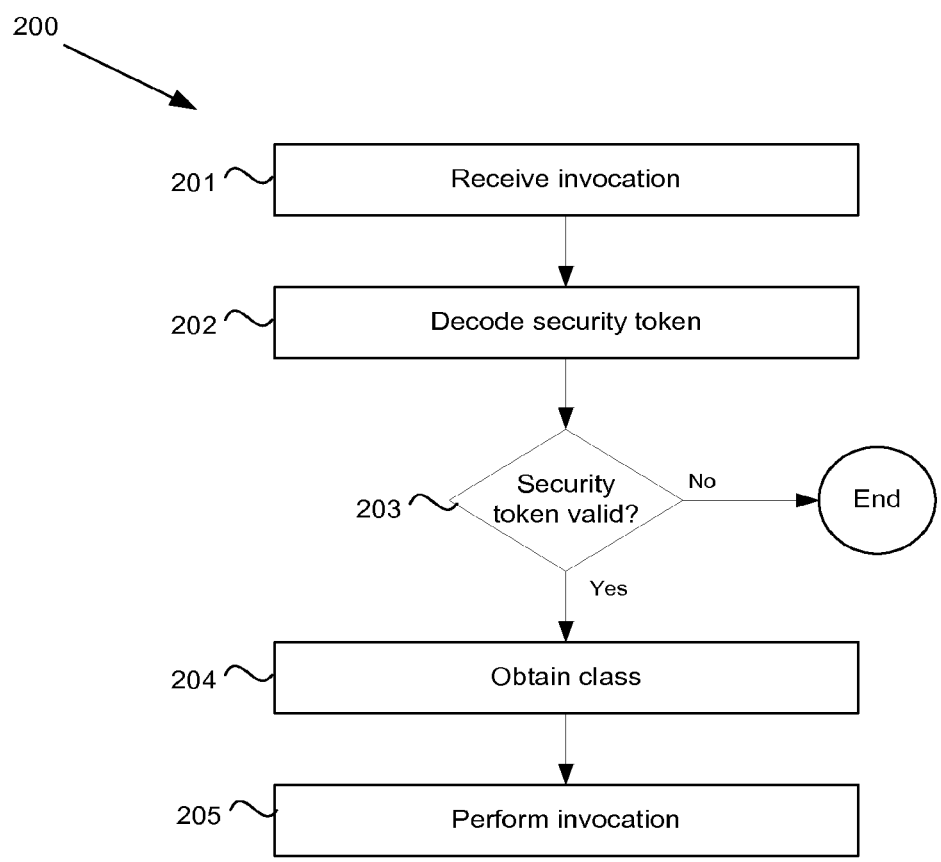
FIG. 3 illustrates a process for performing an invocation.

In FIG. 3 there is shown a process 200 for performing an invocation of a class by the application. At step 201, the request handler 15 receives the invocation and decodes the security token from the invocation at step 202. Provided the security token is valid (step 203), the classloader 14 retrieves the class variant from the appropriate class repository that matches the security permissions indicated in the security token (step 204). The retrieved class may then be used to perform the invocation (step 205).

Figure 4:
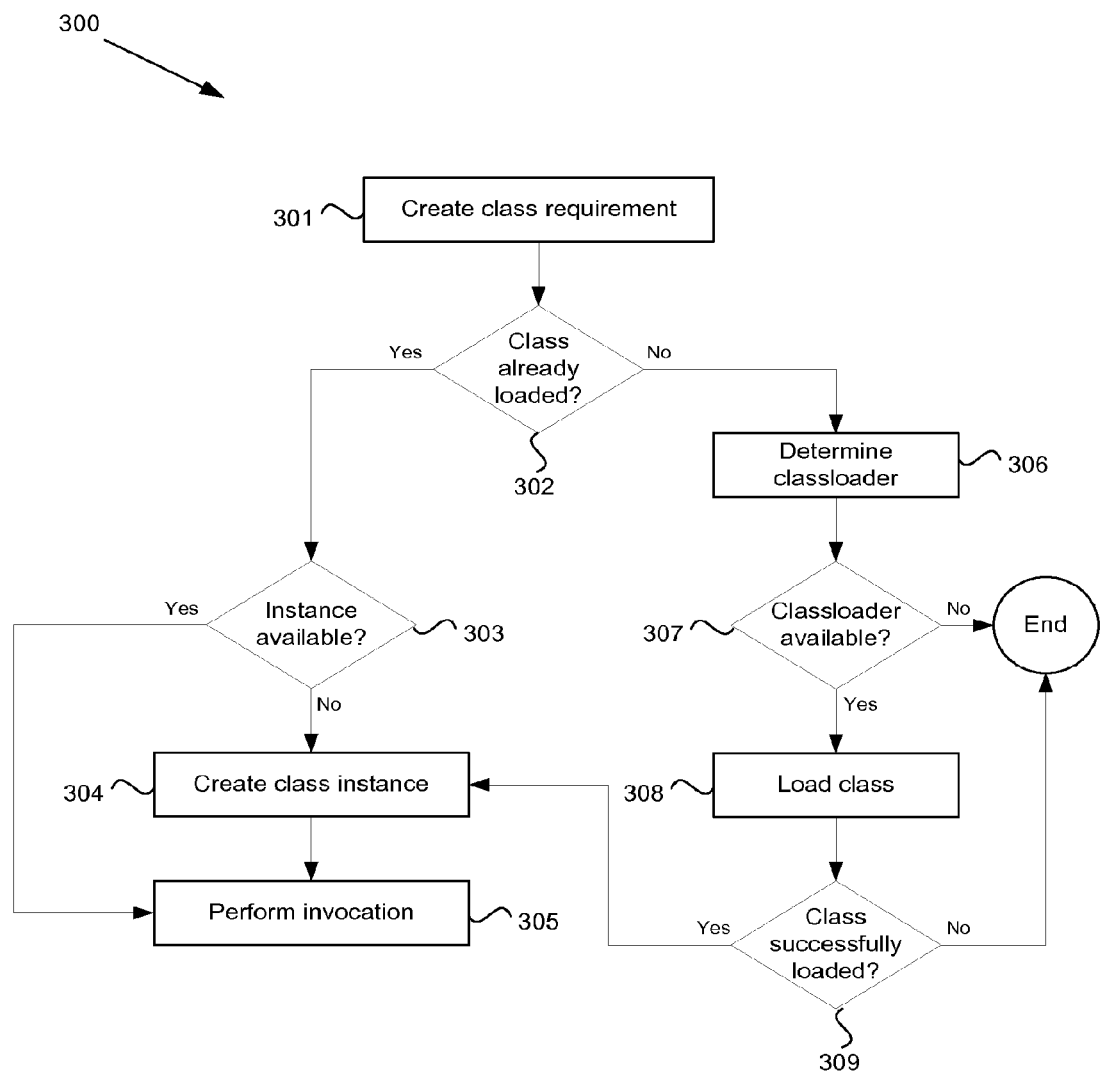
FIG. 4 illustrates a process for obtaining a class instance.

A process for retrieving the class instance is shown in the flowchart 300 of FIG. 4. At step 301, a class requirement is created based on the security permission required and the class operation being performed. If the class has been previously loaded, as determined at step 302 and there is an instance of the class available as determined at step 303 then the invocation may be performed routinely 305. If the class instance is not available but has been previously loaded, then the class instance can be created at step 304 before proceeding to perform the invocation 305. If the class has not been previously loaded (302) then the classloader to be used to load the class is determined at step 306. Each class repository may have a separate classloader for it within the application. This helps to properly firewall the application, and allows multiple variants of the same class to be loaded within the same application process. The classloader is determined based on the security permissions indicated in the class requirement, such as from the security token. If the selected classloader is available (307) then the class is loaded 308. If the class is loaded successfully as determined at step 309, then an instance of the class is created 304 so that the invocation can be performed 305.

When the application is started, it loads a set of security permissions stored on the local computing device. The application is also configured to be aware of a number of class repositories and the permissions each repository requires. The application then initializes a set of security classloaders to load classes from each repository. Each security classloader is configured to load classes from one of the repositories, and is aware of the security permissions required by the repository. As stated previously, the class repositories may be local to the computing device, or remotely accessible through a server.

Figure 5:
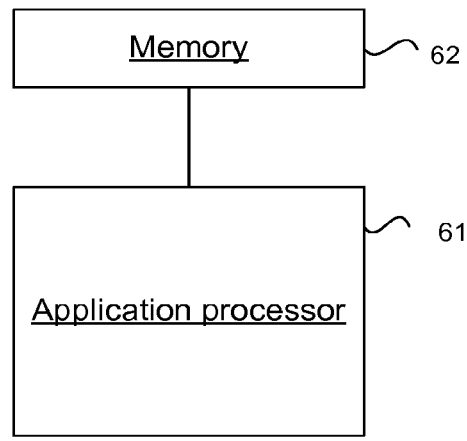
FIG. 5 illustrates a process and memory for executing the application.
Figure 6:
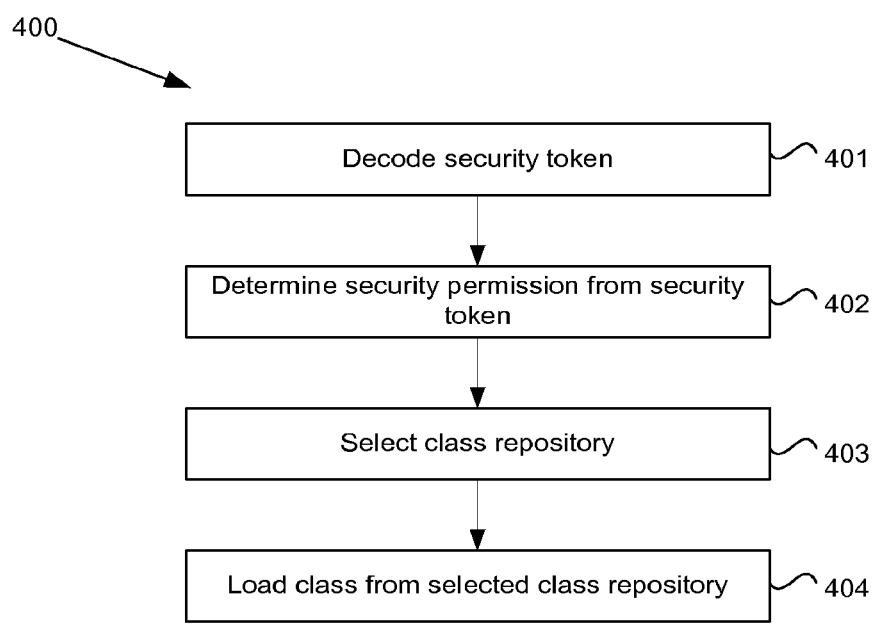
FIG. 6 illustrates an instruction set that is executable on the processor of FIG. 5.
Figure 7:
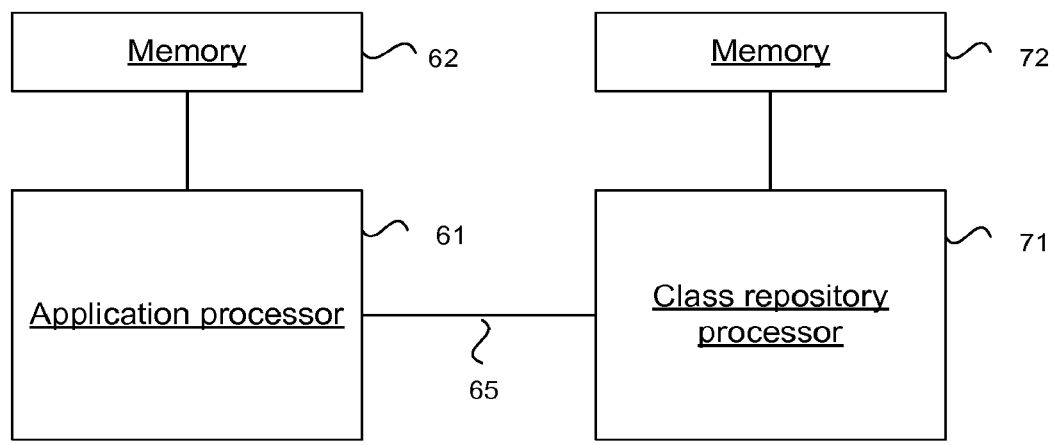
FIG. 7 illustrates an application processor in communication with a class repository processor.

The application may be embodied in hardware, software, firmware or a combination of hardware, software and/or firmware. In a hardware embodiment, the application may execute on a processor 61 operatively associated with a memory 62 as shown in FIG. 5. The memory 62 may store an instruction set 400 executable by the processor 61 as shown in FIG. 6. The instruction set allows the processor 61 to decode a security token (step 401), which may be stored in the memory 62. Once decoded, the processor 61 may determine a security permission indicated in the security token (step 402) and then select a class repository associated with the security permission (step 403). The processor 61 then loads a class from the selected repository (step 403).

The processor 61 may communicate with a second processor 71, such as a class repository processor associated with a memory 72 that stores a number of class repositories. The application processor 61 may send class requests to the class repository processor 71 through a suitable communications link 65.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

The invention claimed is:

1. A method, comprising:
    determining, at a processing device, a class invoked by an application at run time;
    decoding, at the processing device, a security token encoded in the application upon installation of the application; and
    retrieving, from at least one memory store, a class variant based at least in part on decoding the security token;
    wherein the variant defines a level of functionality of the application consistent with the security token.

2. The method of claim 1, further comprising decoding, at the processing device, a security permission encoded in the security token.

3. The method of claim 1, wherein each of a plurality of class variants comprise a same namespace or a same application programming interface.

4. The method of claim 1,
    wherein a first class variant provides a first functionality; and
    wherein a second class variant provides a reduced functionality in comparison to the first class variant.

5. The method of claim 1, further comprising associating each of a plurality of class variants with a class variant repository.

6. The method of claim 1, further comprising storing a plurality of class variants for the class in a repository with a plurality of class variants for at least another class having equivalent security permissions.

7. A device, comprising:
    a memory device configured to store instructions; and
    a processing device configured to execute the instructions stored in the memory device to:
        determine a class invoked by an application at run time;
        decode a security token encoded in the application upon installation of the application to extract a security permission; and
        load a class variant from a corresponding class store based at least in part on the decoded security token;
    wherein the class variant is configured to define a level of functionality of the application consistent with the security permission.

8. The device of claim 7, wherein the processing device is further configured to execute the instructions stored in the memory device to associate each of a plurality of class variants with corresponding security permissions.

9. The device of claim 7, wherein each of a plurality of class variants comprise a same namespace or a same application programming interface.

10. The device of claim 7, wherein the processing device is further configured to execute the instructions stored in the memory device to associate each of a plurality of class variants with a class variant repository.

11. The device of claim 7, wherein the processing device is further configured to execute the instructions stored in the memory device to store the class variant for the class together with a class variant for at least another class having equivalent permissions encoded in corresponding security tokens.

12. The device of claim 7,
wherein a first class variant provides a first functionality and is associated with a first security permission encoded in the security token; and
wherein a second class variant provides a reduced functionality in comparison to the first class variant and is associated with a second security permission encoded in the security token.

13. A computer-readable storage device including computer-executable instructions stored thereon that, when executed by a processing device, configure the processing device to perform operations comprising:
decoding a security permission encoded in a security token upon installation of the application;
determining a class invoked by the application at run time of the application; and
accessing a variant of the class from a store corresponding to the class based at least in part on the security permission decoded from the security token;
wherein the variant of the class is associated with a level of functionality of the application consistent with the security permission.

14. The computer-readable storage device of claim 13, wherein the computer-executable instructions, when executed by the processing device, further configure the processing device to associate each of a plurality of class variants with corresponding security permissions.

15. The computer-readable storage device of claim 13, wherein each of a plurality of class variants comprise a same namespace or a same application programming interface.

16. The computer-readable storage device of claim 13, wherein the computer-executable instructions, when executed by the processing device, further configure the processing device to associate each of a plurality of class variants with a class variant repository.

17. The computer-readable storage device of claim 13, wherein the computer-executable instructions, when executed by the processing device, further configure the processing device to store the class variant for the class together with a class variant for at least another class having equivalent permissions encoded in corresponding security tokens.

18. The computer-readable storage device of claim 13,
wherein a first class variant provides a first functionality; and
wherein a second class variant provides a reduced functionality in comparison to the first class variant.

19. The computer-readable storage device of claim 18,
wherein the first class variant corresponds to a first security permission encoded in the security token; and
wherein the second class variant corresponds to a second security permission encoded in the security token.

20. The computer-readable storage device of claim 19, wherein the computer-executable instructions, when executed by the processing device, further configure the processing device to:
store the first class variant in a first repository; and
store the second class variant in a second repository distinct from the first repository.

* * * * *